United States Patent [19]

Balzer

[11] Patent Number: 4,618,125
[45] Date of Patent: Oct. 21, 1986

[54] SYSTEM FOR HARDENING CAMSHAFTS
[75] Inventor: Norbert R. Balzer, Boaz, Ala.
[73] Assignee: Tocco, Inc., Boaz, Ala.
[21] Appl. No.: 769,399
[22] Filed: Aug. 26, 1985
[51] Int. Cl.$^4$ ............................................. C21D 9/30
[52] U.S. Cl. ...................... 266/90; 266/125; 266/129; 219/10.57
[58] Field of Search ............ 266/78, 80, 90, 92, 266/93, 125, 129, 287; 219/10.77, 10.57, 10.59, 10.43

[56] References Cited

U.S. PATENT DOCUMENTS

| | | | |
|---|---|---|---|
| 2,792,212 | 5/1957 | Kirby et al. | 266/125 |
| 3,502,312 | 3/1970 | Douglass | 266/92 |
| 3,735,083 | 5/1973 | Seyfried et al. | 219/10.41 |
| 3,737,610 | 6/1973 | Armstrong | 219/10.67 |
| 3,784,780 | 1/1974 | Laughlin et al. | 219/10.43 |
| 3,935,416 | 1/1976 | Cachat | 266/92 |
| 3,944,446 | 3/1976 | Bober | 148/131 |
| 3,970,813 | 7/1976 | Day | 219/10.57 |

Primary Examiner—Christopher W. Brody
Attorney, Agent, or Firm—Body, Vickers & Daniels

[57] ABSTRACT

A camshaft heat treating apparatus for processing a plurality of camshaft designs, which camshaft identifies and thereafter automatically inductively heats, quenches and inspects the camshaft in accordance with its design parameters.

6 Claims, 7 Drawing Figures

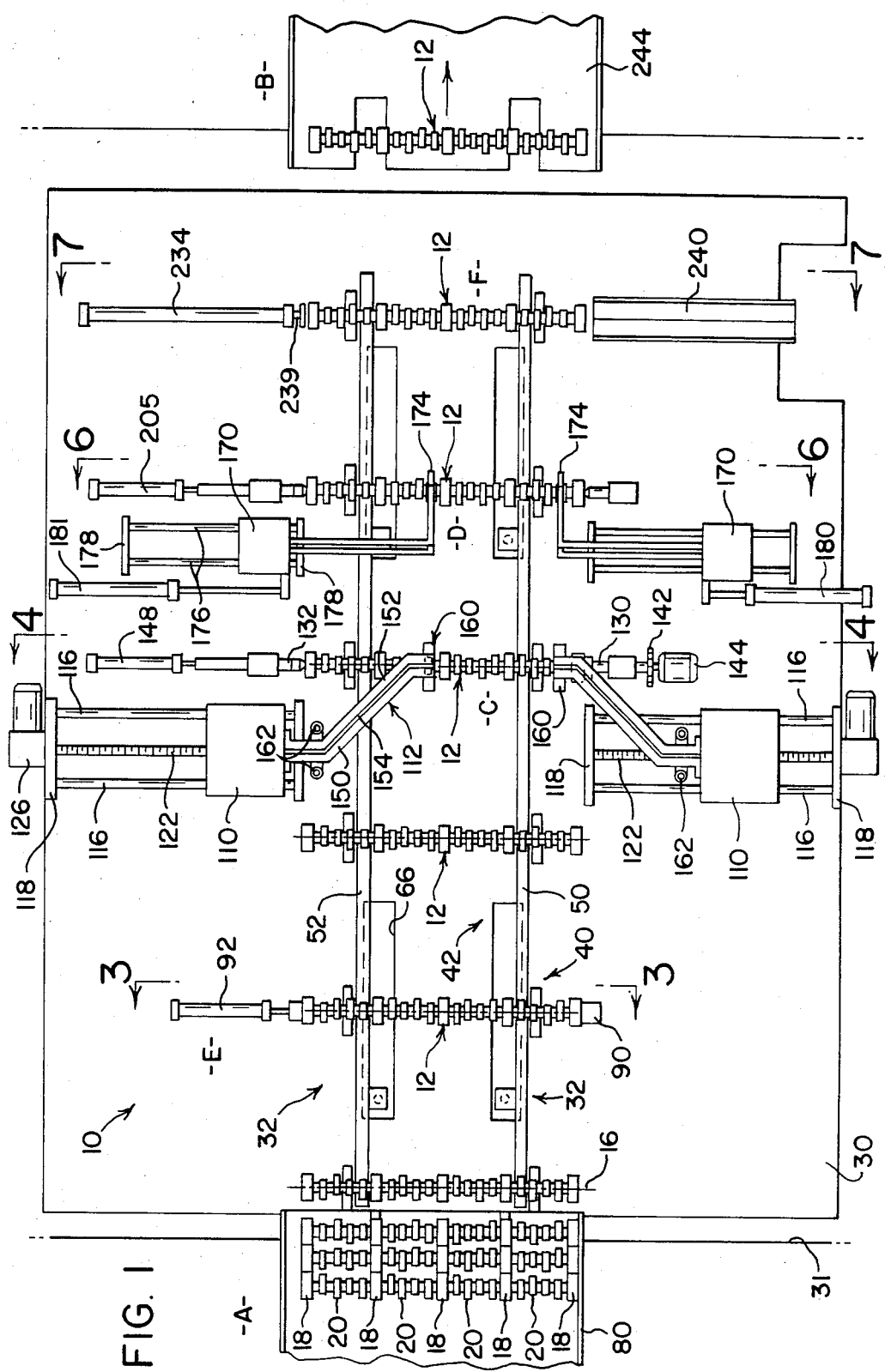

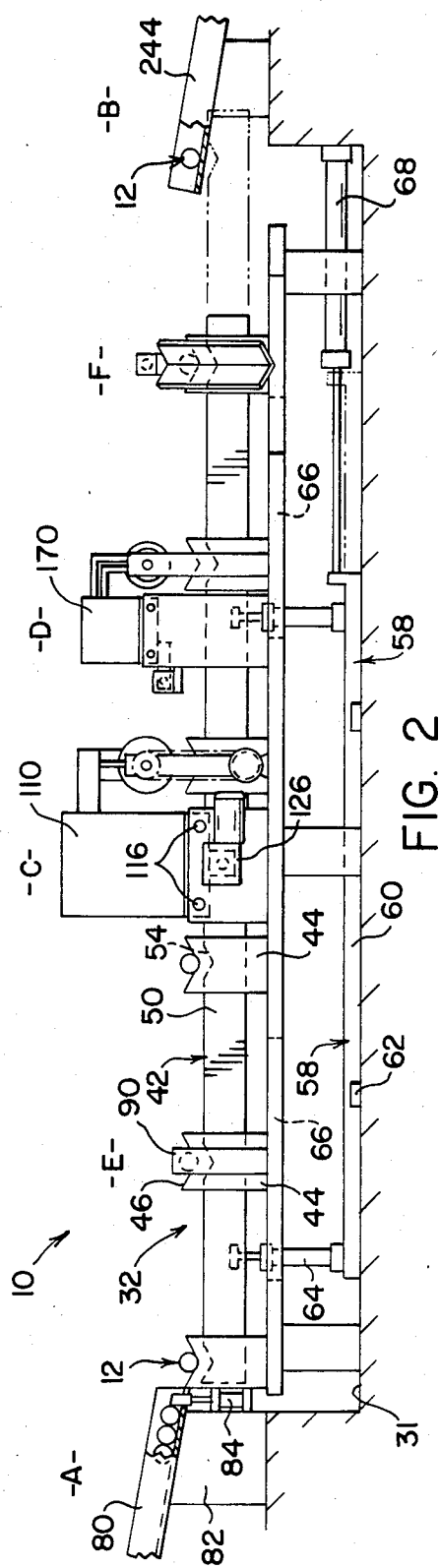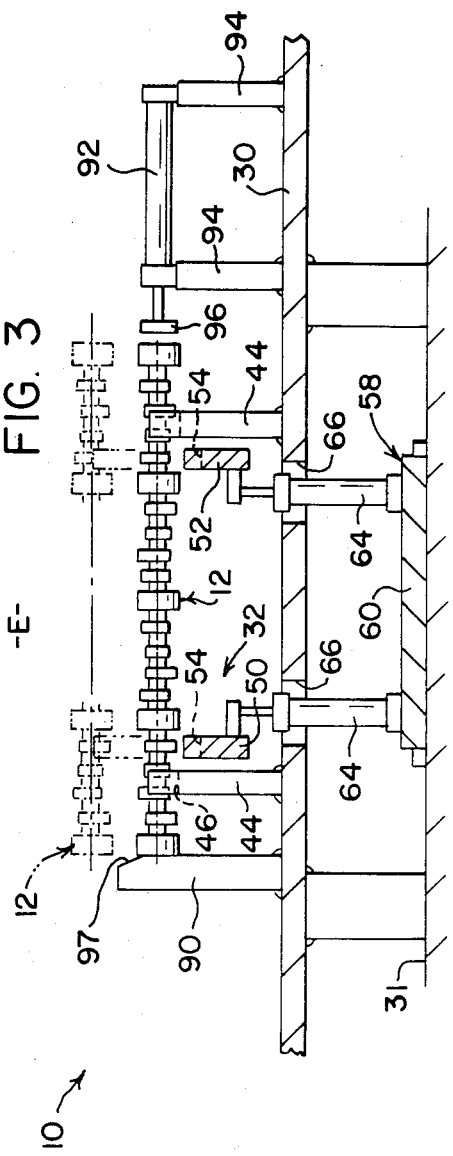

SYSTEM FOR HARDENING CAMSHAFTS

BACKGROUND

The present invention relates to the art of induction heating and, in particular, an apparatus and method for heat treating and inspecting camshafts for internal combustion engines.

The present invention finds particular utility in the heat treatment of internal combustion camshafts and will be described with particular reference thereto; however, it will become hereinafter apparent that the invention has broader applications for the heat treating of cylindrical shafts having a plurality of axially spaced areas to be heat treated wherein the apparatus must be capable of processing a number of shaft designs without a changeover operation for each design.

The camshafts for internal combustion engines are typically elongated cylindrical shafts having a plurality of cam lobes or eccentrics formed thereon which coact with the valve train to open and close associated intake or exhaust valves of the engine. The number of cam lobes, the lobe size, the spacing thereof and the length of the camshaft vary from engine to engine. Because of the demanding service requirements, the cam lobes must be wear resistant and durable. Accordingly, the cam surfaces are hardened preferably by induction heating followed by liquid media quenching. Under current practice, each camshaft design or configuration requires a separate heat treating apparatus or conversion of a somewhat common apparatus. Such conversion must account for length, cam spacing, cam size, number of cams, inductive power level and heating time, quenching time and quenching media. Consequently, the conversion is costly and time consuming. Moreover, such systems require a substantial inventory of unprocessed camshafts to provide an economical production run.

BRIEF SUMMARY OF THE INVENTION

These aforementioned limitations are overcome by the present invention which provides a single heat treating apparatus for appropriately heat treating a camshaft in accordance with the presented design. This is accomplished by providing an identification between the apparatus and the camshaft. Preferably, an identifying parameter of the camshaft such as the length is read by a sensor which relays a coding signal to a microprocessing unit. The information in the input signal is processed to provide output signals for adjusting the various apparatus functions. One of the signals controls the transfer function for moving the identified shaft from the loading station into accurate alignment at the heat treating station and additionally compensates for length variations. Another set of signals initiates the heat treating cycle and sequence. A further set controls an inspection sequence. More particularly, at the heat treating station, the camshaft is located coaxially with an inductor and quenching ring. The inductor and quenching ring are driven coaxially along the length of the shaft by a control motor which is controlled to position each device sequentially at each of the cam lobes in accordance with the shaft configuration. At each cam lobe, the inductor is energized at a power level and for a time determined by the design. Thereafter, the quenching sequence is initialed for applying the coolant under conditions providing the desired cooling rate. The sequencing continues until completion at which time the devices are transversed to the indexed position awaiting the next presented shaft. During the processing, the parameters are monitored, trends statistically analyzed and incremental processing changes initiated for assuming constant treatment conditions subsequent to the heat treating the camshafts are indexed to an inspection station whereat a scanning detector analyzes the electrical and magnetic characteristics. Based on a comparison with microprocessor data, the camshaft is accepted by further downstream processing or rejected and removed from the apparatus at a subsequent position. In this manner, a continuing array of camshaft designs may be heat treated and inspected.

Accordingly, an object of the present invention is the provision of an apparatus for in-line heat treating of a plurality of shaft designs.

Another object is the provision of an apparatus for heat treating a plurality of camshaft configurations wherein the heat treating parameters are identified for each camshaft and adjusted in accordance with the present camshaft configuration.

A further object is the provision of an apparatus for heat treating the cam lobes of a camshaft for an internal combustion engine wherein an inductor and quenching devices are sequentially traversed along the length of the shaft between successive lobes and energized at the lobes to provide a predetermined heat-quench cycle appropriate for the camshaft and lobe configuration.

Yet another object of the present invention is the provision of a heat treating center for internal combustion engine camshafts of varying lengths, lobes and heat treatment requirements wherein each camshaft is identified and heat treated and inspected with the identical configuration.

BRIEF DESCRIPTION OF THE DRAWING

The above and other objects and advantages of the present invention will become apparent upon reading the following description taken in conjunction with the accompanying drawings in which:

FIG. 1 is a top plan view of the heat treating unit according to the invention:

FIG. 2 is a side elevational view of the heat treating unit of FIG. 1:

FIG. 3 is a view taken along line 3—3 of FIG. 1;

DETAILED DESCRIPTION OF THE PREFERRED EMBODIMENT

Figure 4:
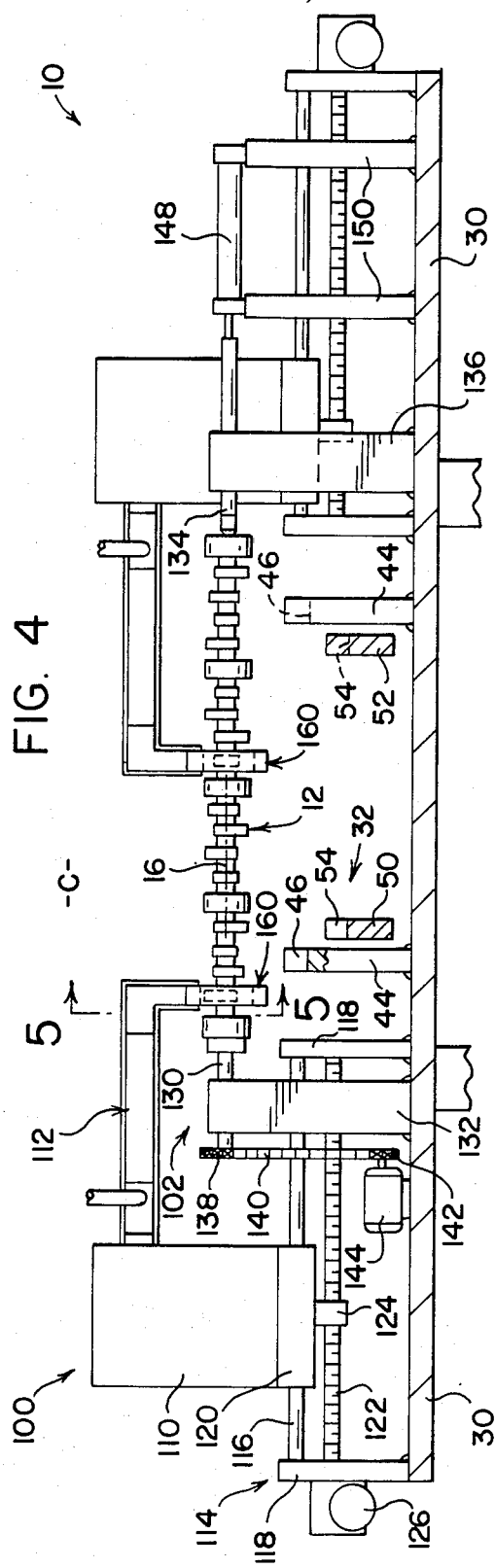
FIG. 4 is a view taken along line 4—4 of FIG. 1.

Referring now to the drawings wherein the showings are for the purpose of illustrating the preferred embodiment of the invention only and not for the purpose of limiting the same, FIG. 1 shows a heat treating unit 10 for inductively heat treating camshafts 12 for internal combustion engines. The camshaft 12 is typically an elongated cylindrical shaft formed of a heat treatable ferrous material such as iron or steel, which is conventionally machined in prior operations, not shown. As presented to the heat treating unit 10, the camshaft 12 has an elongated central body having machined centers at the ends thereof describing a rotational axis 16. Five axially spaced journals 18 are longitudinally spaced along the camshaft 12 and are concentric with axis 16. Four sets of cam lobes 20 are axially spaced along the camshaft body between adjacent journals 18. The cam lobes 20 are enlarged with respect to the central body and have a cross-section which may be circular and eccentric to the axis 16 or may be profiled with respect to the axis 16 so as to control operation of intake valves and the exhaust valves of an internal combustion engine. Depending on the engine design, many of the camshaft parameters will vary. The overall length, number and size of the journals and lobes, as well as the spacing thereof, the shaft material and hardness will be uniquely prescribed for that particular engine design. The present heat treating unit recognizes the various designs, as presented, and coordinates the transfer, positioning, heat treating and inspecting functions to accommodate the design array on an in-line continuous basis.

More particularly, as shown in FIGS. 1 and 2, the heat treating unit 10 comprises a base 30 for mounting the unit 10 on a suitable support or foundation 31, and a walking beam transfer unit 32 for sequentially advancing untreated camshafts received from an upstream processing operation A and for simultaneously advancing heat treated and inspected camshafts to a downstream processing operation B. As hereinafter described in greater detail, the transfer unit 32 sequentially raises the camshafts 12 to a heat treating station C and an inspection station D. The camshafts 12 are transversely aligned on the transfer unit 32 at an identification station E adjacent the entry end thereof and unsatisfactory camshafts are removed from the unit at a rejection station F adjacent the exit end thereof.

The transfer unit 32, illustrated somewhat schematically, is of a conventional walking beam type. The unit 32 includes a stationary beam assembly 40 and a longitudinally shiftable beam assembly 42. While the stationary beam assembly may comprise a pair of elongated beam sections, as shown in FIGS. 1 and 2, the present assembly 40 comprises a plurality of vertically notched plates 44 attached to the base 30. The plates 44 are aligned in two parallel longitudinal rows and uniformly longitudinally spaced along the base 30. The plates 44 have upwardly opening V-shaped notches 46 defining camshaft receiving nests. The nests of opposed plates are transversely aligned. As representatively shown in FIG. 2, the diverging side walls of the notches 46 engage the camshaft 12 to thereby vertically align the camshaft axis 16 with the apex thereof and additionally uniformly space the camshafts along the length of the stationary beam assembly 40.

The shiftable beam assembly 42 of the transfer unit 32 includes a pair of movable or walking beams 50 and 52. The beams 50, 52 extend parallel to and are located transversely intermediate the rows of the stationary plates 44. The beams 50, 52 include V-shaped notches 54 on the upper surface thereof which align the camshafts thereon similar to the notches in the stationary beam assembly 40. The beams 50, 52 are supported in a well known manner on movable platform assemblies 58. The assemblies 58 each comprise a shiftable base plate 60 longitudinally slidably supported on the foundation 31 by brackets 62. Four hydraulic actuators 64 have cylinders connected to the top surface of the plate 60 and output shafts connected to the beams 50, 52. The actuators 64 project through the base 30 at elongated longitudinal slots 66. A linear actuator 68 has a cylinder connected to a vertical side wall of the foundation 31 and an output shaft connected to the plate 60. In a well known manner, the actuator 68 is operative to shift the plate 60 and accordingly movable beam assemblies 42 between the extended position shown in the solid lines and the retracted position shown in the dashed lines. Concurrent actuation of actuators 64 is effective to raise the beam assembly 42 between the lower position illustrated in solid lines and the raised position illustrated in dashed lines in FIG. 3. In operation, with the camshafts aligned in the various stationary nests and the movable beam assembly in the extended position, the actuators 64 are extended thereby transferring the camshafts 12 from the stationary nests to the movable nests. The actuator 68 is then retracted to shift the beam assembly 42 toward the exit end thereby carrying the camshafts into alignment with and vertically above the next adjacent stationary nests. Thereafter, the beam assembly 42 is lowered thereby depositing the camshafts on the stationary nests, the actuator 68 being subsequently extended to shift the beam assembly 42 once again leftwardly to the illustrated position.

The loading station A comprises a chute 80 supported by a frame 82 on the foundation 31. The chute 80 is inclined downwardly for registration with the first set of stationary nests. An actuator controlled gate assembly 84 is retractable to downwardly discharge the camshafts, one at a time, onto the first set of stationary nests in accordance with the controlled sequencing of the transfer unit 32.

The alignment and identification station E is located intermediate the loading station A and the heat treating station C. As shown in FIGS. 1–3, the station E comprises a vertically extending alignment plate 90, located laterally outwardly of the plates 44, and a linear actuator 92 located outwardly of the other row of plates 44 and supported on the base 30 by legs 94. The output shaft of the actuator 92 includes a circular pusher plate 96. The alignment plate 90 is provided with an inclined upper surface 97. As presented at the first set of stationary nests, the camshaft 12 may be variably laterally aligned. The surface 97 will deflect camshaft inwardly onto rough alignment on the plates 44. Thereafter, the actuator 92 extends the pusher plate 96 to laterally align the camshaft against the inner vertical surface of the alignment plate 90. Detectors 99 are coupled to the actuator 92 to sense the overall length, and accordingly the camshaft design, in the extended position. Based on this identification, the heat treating and inspecting cycles are suitably controlled when that particular camshaft arrives at the stations C and D. Additional sensing and detecting devices may be provided in the event plural camshafts have identical lengths. In such an instance, the camshafts may be bar coded and a suitable reader positioned adjacent the station E for determining the camshaft design located at the alignment nests. Additionally, photo-electric sensors or other detection devices may be located adjacent discrete portions of the camshaft for detecting which design is located thereat. After completion of the aligning and identifying operation, the transfer unit 32 is cycled once again to advance the camshafts along the unit.

After alignment at station E, the transfer unit 32 advances the camshafts 12 to the next adjacent nests and thereafter to the heat treating station C. More particularly, as shown in FIGS. 2 and 4, the heat treating station C comprises two heat treating assemblies 100 and a camshaft centering assembly 102. Each heat treating assembly 100 comprises a power supply 110 carrying an inductor 160 and lead assembly 112. The heat treating assemblies 100 are movably supported on the base 30 by drive assemblies 114. More particularly, each drive assembly 114 comprises a pair of lateral guide rods 116, supported on vertical plates 118 attached to the base 30 and journaled in bushings, not shown, in the base 120 of the power supply 110 and a lead screw 122 rotatably supported by the plates 118 and threadedly connected to a threaded block 124 on the base 120 of the power supply 110 and drivingly connected to a control motor and drive unit assembly 126. Energization of the units 126 rotates the lead screws 122 to thereby selectively laterally shift the power supplies 110 along the guide rods 116 to accurately position the inductor and lead assemblies 112 with respect to the camshaft 12 as hereinafter described.

The centering assembly 102 includes a fixed center 130 rotatably supported on a vertical post 132 on the outer end of the base 30, nad a live center 134 supported on a vertical post 136 on the inner end of the base 30. The fixed center 130 engages the center in the end journal of the camshaft for coaxially supporting the camshaft and the live center 134 engages the center of the camshaft adjacent the other end journal whereby the camshaft 12 is rotatably supported for rotation about its axis 16 coincident with the axis of rotation of the centers 130 and 134. The outer end of the fixed center 130 includes a gear 138 which engages a drive chain 140 operatively connected to a gear 142 connected to the output shaft of a control motor 144. The outboard end of the live center 134 is operatively connected to the output shaft of a linear actuator 148 carried on the base 30 by frame members 150. With the movable beams 42 of the transfer unit 32 in the elevated position, a camshaft at the heat treating station will be approximately coaxially aligned with the centers 130 and 134. The actuator 148 then extends the center 134 until both centers are seated against the camshaft and the latter is rotatably supported thereon. The control motor 144 is selectively energized as hereinafter described during the heat treating cycle to incrementally rotate the camshaft about its axis.

The lead assembly 112 comprises a first lead 150 and a second lead 152 mutually separated by a noninsulating spacer 154. The leads 150 and 152 include outer ends connected to the output leads of the power supply 110 and inner ends connected to a single turn inductor and quenching coil 160. The lead assembly 112 includes an intermediate section which is longitudinally offset such that the coil 160 is coaxially aligned with the centers 130, 134. The leads 150, 152 have a conventional rectangular cross-section with an internal passage conventionally supplied with quenching media from a source, not shown, through pipes 162.

Figure 5:
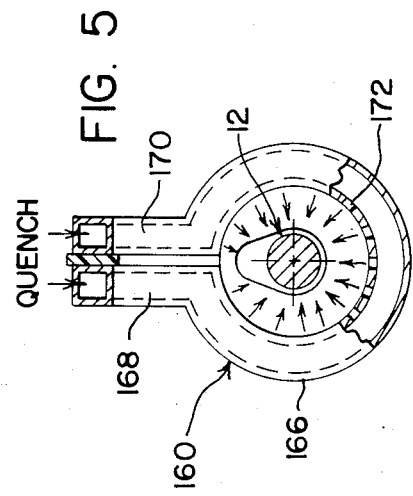
FIG. 5 is an enlarged view taken along line 5—5 of FIG. 4.

Referring to FIG. 5, the coil 160 is formed of square copper tubing in a conventional single loop design. The coil 160 includes a circular ring 166 which is split at a vertical gap and has leads 168 and 170 fluidly and electrically connected to the leads 150 and 152, respectively. The inner surface of the ring 166 is provided with a plurality of radially directed ports 172. In operation, quenching liquid is delivered from pipes 162, through the passages into the ring section 166 and outwardly therefrom through ports 172 in a well known manner.

The power supply 110 has a normal retracted position adjacent the outer end of the guide rods 116 such that the camshaft 12 may be raised and lowered with respect to the centering unit 122 during the sequencing operations. Thereafter, the assemblies 100 are individually selectively controlled to scan the various cam lobes and journals during a heat treating cycle described below. Following completion of the heat treating cycle the assemblies are once again returned to the retracted position. Thereafter, movable beam assembly 32 is raised, the centering unit 102 released and the heat treated camshaft deposited on the movable nests. The movable beams are then lowered and advanced to present the heat treated camshaft at the inspection station D.

Figure 6:
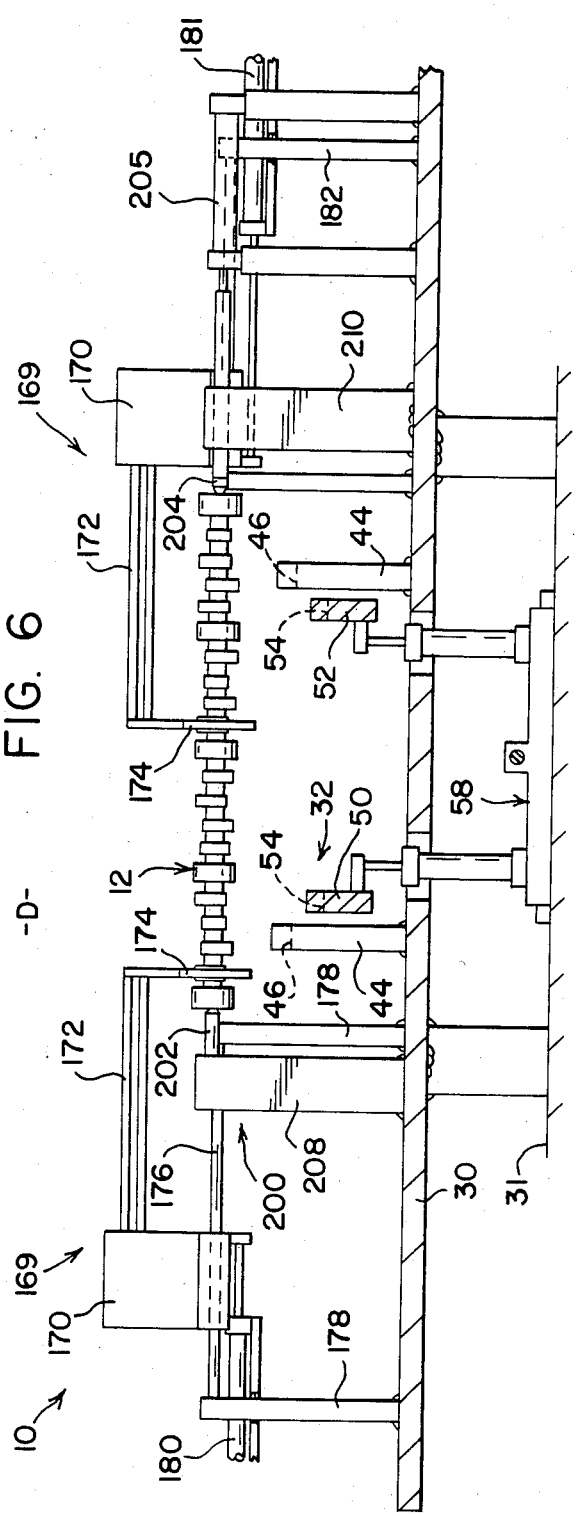
FIG. 6 is a view taken along line 6—6 of FIG. 1.
Figure 7:
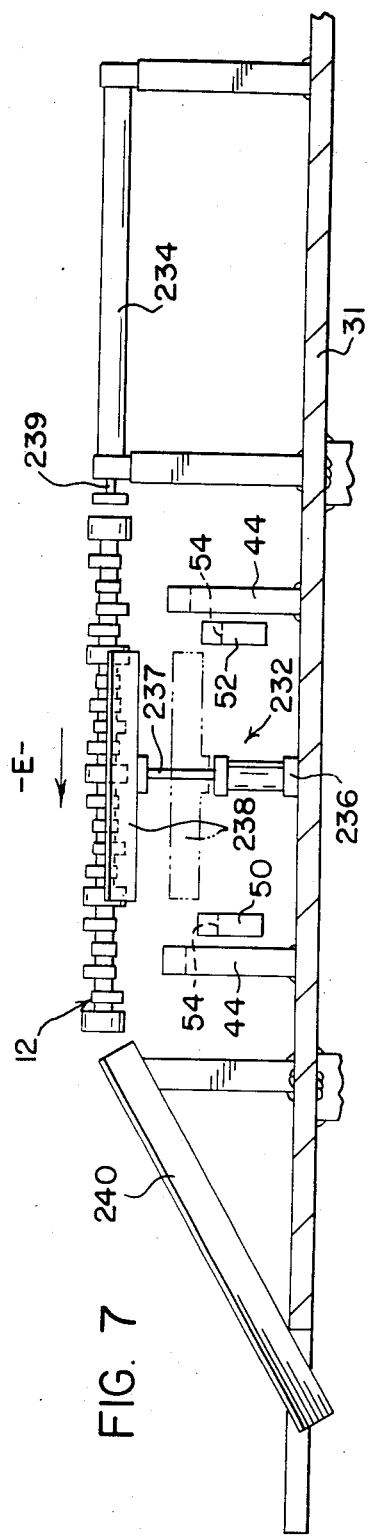
FIG. 7 is a view taken along line 7—7 of FIG. 1

Station D determines the quality of hardening provided at the heat treating station C to determine the acceptability of the finished product. More particularly, as shown in FIGS. 1, 2 and 6, a pair of detector assemblies 169 are located on opposite lateral sides of the unit. Each detector assembly 169 comprises a detector unit 170 having a lead assembly 172 carrying an eddy current coil 174. The unit 170 is slidably supported on guide rods 176 horizontally carried by vertical plates 178 attached to the base 30. The base of the unit 170 is connected to the output shaft of a linear actuator 180 supported on the base 30 by frame 182. The actuator 180 normally retains the unit 170 in a retracted position wherein the coil 174 is spaced outwardly of the camshaft thereat. The camshaft 12 is presented to the inspection station in a manner similar to that described with reference to the heat treating station. More particularly, a centering unit 200 comprising a fixed center 202 and a live center 204 and an actuator 205 accurately rotatably supports the camshaft. The fixed center 202 is rotatably supported on post 208. The live center 204 is rotatably and reciprocably supported by a post 210. The live center 200 is connected at the output shaft of the linear actuator 205. When the movable beams are raised to an elevated position, the camshaft is substantially aligned with the axes of the centers 202, 204. Thereafter, the actuator 205 is extended to thereby rotatably support the heat treated camshaft. The actuator 180 is thereafter extended to telescope the coil 174 to a position overlying the cam lobe adjacent the center journal. Concurrently therewith the actuator 180 of the inner unit is extended to locate its eddy current coil 174 at the inner end journal of the camshaft. Thereafter, the actuator 180 is retracted and the actuator 181 extended whereby the coils 174 progressively scan the respective halves of the camshaft length. The eddy current coil output is sensed by the detector 170 and corrolated to variations therein indicative of various defects such as structural cracks in the hardened surface. The detectors 170 are coupled to the rejection station E as described below for removal of the camshaft from the unit in the event eddy current profile does not satisfy criteria for acceptability. Upon completion of the scanning cycle, the actuators 180 and 181 are retracted to locate the coils 174 remote from the camshaft. The movable beam assembly 42 during the next cycle is raised to engage the camshaft, the actuator 205 retracted to release the camshaft whereby the latter is deposited into the movable beam nests. The walking beam assembly is then advanced to locate its inspected camshaft adjacent the nests at the rejection station E. The movable beam assembly 42 is then lowered to deposit the inspected camshaft on the stationary nest. The rejection station E is provided with a rejection assembly 230 comprising an elevator assembly 232 and a rejection actuator 234. The elevator assembly 232 comprises a linear actuator 236 having an output shaft 237 connected at its upper end to a V-shaped support trough 238 having diverging side walls engageable with the periphery of the camshaft. The rejection actuator 234 includes an output shaft 239 aligned with the trough 238. If an unacceptable camshaft has been detected by the unit 170 at the inspection station D, the actuator 234 is extended and the shaft 239 pushes the camshaft 12 inwardly for release onto a downwardly inclined rejection chute 240 which directs the rejected camshaft into a suitable bin, not shown.

In the event the inspected camshaft is satisfactory, during the next cycle of operation, the camshaft 12 is raised from the stationary nests and carried to an inclined output chute 244 at the unloading station B. The front of the chute 244 is slotted to receive the walking beams. As the movable beam assembly is lowered, the camshaft 12 engages the base of the chute 244 and, as the assembly is further lowered, released from engagement by the nests thereafter rolling down the chute 244 for handling at a further processing operation, not shown.

Operation of the Heat Treating Unit

In operation, camshafts of varying designs may be handled in serial fashion by the heat treating unit above described. The operation will be described with reference to a single camshaft traversing the operations at stations A through F. In the initial position, the walking beam assembly will be in the illustrated leftward position with the nests adjacent station A vacant. The gate assembly 84 is momentarily actuated to permit the first camshaft 12 to roll down the chute 80 and on to the first set of stationary nests. The actuators 64 are then extended to raise the movable beam assembly 42 thus transferring support of the camshaft 12 from the stationary nests to the vertically aligned movable nests. The actuator 68 is then retracted and the walking beam assembly is shifted rightwardly until the nest thereof is vertically aligned at the alignment station E. The actuators 64 are then retracted to transfer support of the camshaft from the movable nests to the stationary nests. Thereafter, as shown in FIG. 3, the actuator 92 is extended to shift the camshaft into alignment with the alignment plate 90. After the alignment operation, the walking beam assembly is lowered and shifted by actuator 68 to the leftward position.

Next, the actuators 64 are once again extended to transfer support of the aligned camshaft from the stationary nests to the movable nests. At the extended raised position, the actuator 68 is retracted to advance the aligned camshaft to a vertically aligned position with the next adjacent stationary nests. The beam assembly 42 is then lowered and cycled in the aforementioned manner. In the next upward cycle of the walking beam assembly, the alinged camshaft is removed from the stationary nests onto the walking nests and advanced into alignment with the centering unit 102 at the heat treating station C. The heat treating assemblies, at this time, are located overlying the centers 130 and 132 and thus remote from the camshaft. The actuator 148 is extended to thereby rotatably support the camshaft between the centers 130 and 132. Thereafter, the outer drive unit 126 is energized to locate the inductor coil 160 at the cam lobe adjacent the center journal. The other drive unit 126 is energized to locate the associated inductor coil at the outer journal. Thereafter, the power supplies 110 are energized concurrently, or preferably sequentially, to inductively heat the camshaft surface located at the respective inductor coil. Preferably, the control motor 144 is selectively energized to locate the tip of the cam lobe adjacent the gap in the inductor coil as illustrated in FIG. 5. This will provide rather uniform inductive heating of the cam lobe in a non-rotating mode. Alternatively, the motor 144 may be continuously energized to provide for uniformity of heating for either the journals or the cam lobes. Subsequent to the inductive heating, the quenching system is energized to deliver quenching liquid through the ports 172 onto inductively heated cam surfaces to thereby cool the surface at a rate sufficient for quench hardening the same to the desired hardness. The aforementioned heating and quenching operations are serially repeated at each of the cam surfaces until completion of the entire camshaft. Thereafter, the assemblies 110 are fully retracted, the beam assembly 42 raised, the center assembly 102 released whereby the heat treated camshaft is deposited on the adjacent movable nests. The actuators 64 are retracted to lower the beam assembly 42 and deposit the heat treated camshaft on the stationary nests thereat and the beam assembly 42 moves to the extended leftward position. During the next lifting cycle of the beam assembly, the heat treated camshaft is transferred from the stationary nests onto the movable nests and rightwardly shifted to the full extended position at the inspection station D in substantial alignment with the centering assembly. The eddy current coils 174 at the inspection station are in the fully retracted position to permit entry of the heat treated camshaft. Next, the actuator is extended to thereby rotatably support the heat treated camshaft between the centers. The walking beam assembly 42 is then fully or partially lowered. The actuators 180 and 181 are then selectively extended to position the left unit at the end cam lobe and the right unit at the cam lobe adjacent the central journal. The actuators 180, 181 are then respectively extended and retracted to scan the various heat treated surfaces for electrical discontinuities. Following completion of the scanning, both coils 174 are moved to the retracted position. The beam assembly 42 is then again raised to the camshaft. The center assembly 200 is released and the inspected camshaft deposited on the movable nests. The walk beam assembly 42 is lowered to deposit inspected camshaft on to the adjacent stationary nests. Thereafter the beam assembly 42 is then shifted leftwardly as described above. During the next cycle of the walking beam assembly, the inspected camshaft is lifted from the stationary nests and rightwardly advanced into alignment with the rejection station F, and deposited on the associated stationary nests. If the inspected camshaft is deficient, the actuator 236 is extended whereby the trough 238 lifts the camshaft 12 from the stationary nests into alignment with the cylinder 234. The cylinder shaft is extended to push the defective camshaft on to the injection chute for delivery to the rejection bin. If the camshaft has been satisfactorily heat treated, during the next cycle of the walking beam assembly lifts the camshaft from the stationary nests and rightwardly transferred to above the entry end of the unloading chute 244. As the walking beam assembly is lowered, the camshaft 12 is deposited on the base of the chute 244 and rolls downwardly to a further processing station as the movable beam assembly is further lowered.

During the processing, the above described additional camshafts of varying design are loaded on to the machine and processed in the above described manner with the heating, quenching and inspection operations being prescribed by the parameters therefor. Thus, regardless of the array of camshaft designs arriving at the loading station, the present heat treating unit will be able to determine the camshaft design and tailor the heat treating and inspection operation for assuring the exiting camshafts will have attained predetermined specifications.

Having thus described the invention, it is claimed:

1. An apparatus for hardening axially spaced cams of an elongated camshaft having an axis of rotation and a plurality of cams axially spaced along said axis and with the cam lobes of each cam having an axially outwardly projecting tip at a preselected circumferentially orientation, said apparatus comprising:
   (a) a first induction heating coil having a generally circular inner surface and an electrically insulating gap at a selected location on said inner surface of said first heating coil;
   (b) a second induction heating coil having a generally circular inner surface and an electrically insulating gap at selected location on said inner surface of said second heating coil;
   (c) a first power supply for energizing said first heating coil;
   (d) a second power supply for energizing said second heating coil;
   (e) means for mounting said one of said camshafts with said axis extending through said first heating coil;
   (f) means for causing relative movement of said one camshaft axially with respect to said first coil until one of said cams is within said first coil;
   (g) means for circumferentially indexing said one camshaft with respect to said first coil until said tip of said axially aligned cam is adjacent said electrically insulating gap of said first coil;
   (h) first energizing means for energizing said first coil by said first power supply while said cam of said one camshaft is in its circumferentially indexed position;
   (i) means for quench hardening said cam of said one camshaft while said cam of said one camshaft is within said first heating coil;
   (j) means for heating another cam of one of said camshafts said second heating coil by said second power supply before said cam of said one camshaft is quench hardened, including means for axially shifting said another cam into said second heating coil and second energizing means for energizing said second coil with said second power supply;
   (k) means for quench hardening said another cam while said other cam is within said second heating coil;
   (l) means for then indexing a first subsequent unhardened cam axially into said first heating coil and a second subsequent unhardened cam into said second heating coil; and,
   (m) means again actuating said first and second energizing means to heat said first and second subsequent cams with said first and second heating coils, respectivley.

2. An apparatus as defined in claim 1 wherein said cams are all on one camshaft and including means for coaxially mounting said first and said second heating coils.

3. An apparatus as defined in claim 1, including means for testing said cams after they are hardened, said testing means including an eddy current coil means having a central opening and an output signal means for scanning said eddy coil axially along said hardened cams, and detection means for rejecting a camshaft when a cam of said camshaft fails to meet selected conditions by a signal from said output signal means.

4. An apparatus as defined in claim 2, including means for testing said cams after they are hardened, said testing means including an eddy current coil means having a central opening and an output signal means for scanning said eddy coil axially along said hardened cams, and detection means for rejecting a camshaft when a cam of said camshaft fails to meet selected conditions by a signal from said output signal means.

5. An apparatus as defined in claim 1, including means for mounting said camshafts horizontally.

6. An apparatus as defined in claim 2, including means for mounting said camshafts horizontally.

* * * * *